(12) United States Patent
Blea et al.

(10) Patent No.: US 8,788,877 B2
(45) Date of Patent: Jul. 22, 2014

(54) ACQUIRING A STORAGE SYSTEM INTO COPY SERVICES MANAGEMENT SOFTWARE

(75) Inventors: Amy N. Blea, Round Rock, TX (US); David R. Blea, Tucson, AZ (US); William D. Olsen, Tucson, AZ (US); John J. Wolfgang, Midlothian, VA (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 13/197,675

(22) Filed: Aug. 3, 2011

(65) Prior Publication Data

US 2013/0036326 A1  Feb. 7, 2013

(51) Int. Cl.
*G06F 11/00* (2006.01)

(52) U.S. Cl.
USPC .......................................................... 714/6.23

(58) Field of Classification Search
CPC ............ G06F 11/1658; G06F 11/1662; G06F 11/2056; G06F 11/2069; G06F 11/2082; G06F 11/2094
USPC .......................................................... 714/6.23
See application file for complete search history.

(56) References Cited

U.S. PATENT DOCUMENTS

| 6,978,282 | B1 | 12/2005 | Dings et al. | |
|---|---|---|---|---|
| 2004/0024979 | A1* | 2/2004 | Kaminsky et al. | 711/162 |
| 2004/0088417 | A1* | 5/2004 | Bober et al. | 709/227 |
| 2005/0027754 | A1* | 2/2005 | Gajjar et al. | 707/200 |
| 2005/0076263 | A1* | 4/2005 | Tomita | 714/6 |
| 2006/0047712 | A1* | 3/2006 | Shitomi et al. | 707/202 |
| 2007/0050573 | A1* | 3/2007 | Arakawa et al. | 711/162 |
| 2008/0065843 | A1* | 3/2008 | Bartfai et al. | 711/162 |
| 2008/0082496 | A1* | 4/2008 | Kalos et al. | 707/3 |
| 2008/0098043 | A1 | 4/2008 | Galipeau et al. | |
| 2008/0209146 | A1* | 8/2008 | Imazu et al. | 711/162 |
| 2008/0263111 | A1* | 10/2008 | Asano et al. | 707/204 |
| 2008/0313399 | A1* | 12/2008 | Kezuka et al. | 711/114 |
| 2009/0271445 | A1* | 10/2009 | Emaru et al. | 707/200 |
| 2010/0058012 | A1* | 3/2010 | Okada et al. | 711/162 |
| 2010/0088485 | A1* | 4/2010 | Ikeda et al. | 711/170 |
| 2010/0138395 | A1 | 6/2010 | D'Souza et al. | |

(Continued)

FOREIGN PATENT DOCUMENTS

| JP | 11096059 A | 4/1999 |
|---|---|---|
| JP | 2005/338893 A | 12/2005 |
| JP | 20061260236 A | 9/2006 |

OTHER PUBLICATIONS

Kubiatowicz et al., "OceanStore: An Architecture for Global-Scale Persistent Storage", © ACM, 2000, Cambridge, MA, Nov. 12-15, 2000, pp. 190-201.

*Primary Examiner* — Joshua Lohn
(74) *Attorney, Agent, or Firm* — Zilka-Kotab, PC

(57) ABSTRACT

In one embodiment, a computer program product includes a computer readable storage medium having computer readable program code embodied therewith, configured for: validating a replication of copy services between a first storage system and a second storage system, removing a plurality of existing copy relationships between the first storage system and a failed storage system, creating a plurality of copy relationships between the first storage system and the second storage system, and synchronizing a plurality of data between the first storage system and the second storage system. In more embodiments, a system includes logic for performing the above functionality, and a method includes steps for performing the above functionality.

19 Claims, 8 Drawing Sheets

(56) References Cited

U.S. PATENT DOCUMENTS

| | | | |
|---|---|---|---|
| 2010/0146232 A1* | 6/2010 | Maki et al. | 711/162 |
| 2010/0229047 A1* | 9/2010 | Mikami | 714/46 |
| 2010/0306380 A1* | 12/2010 | DeHaan | 709/226 |
| 2011/0191556 A1* | 8/2011 | Anderson et al. | 711/162 |
| 2011/0307596 A1* | 12/2011 | Kaneko et al. | 709/223 |
| 2012/0131287 A1* | 5/2012 | Nishina et al. | 711/154 |

* cited by examiner

ACQUIRING A STORAGE SYSTEM INTO COPY SERVICES MANAGEMENT SOFTWARE

BACKGROUND

The present invention relates to data storage, and more particularly, this invention relates to copy services management software in data storage systems and networks.

Currently, when a data storage infrastructure experiences a disaster involving complete loss of one or more storage systems or complete loss of communication between storage systems, there is no way of automatically initiating copy services with a second storage system, even if the second storage system is configured identically to the lost storage system. Thus, in the event of a disaster destroying a storage system completely, the user would have to manually bring up the second storage system, configure it exactly the same, and reconfigure the copy services management software to create new relationships in order to start the copy services from the first storage system to the second storage system, and/or vice-versa.

In conventional copy services management software, this process has been performed manually, even if the second storage system is configured exactly the same as the first storage system, because the serial numbers, location, etc., for the two storage systems are different. As a result, users who experience a disaster involving complete loss of a storage system or complete loss of communication between storage systems face a manually intensive and time-consuming recovery process. System downtime during such a manual recovery process can be significant, especially today, where typical storage systems are large and involve complex relational structures including thousands of data storage relationships and huge volumes of data. The ultimate result leaves current copy management services customers without any significant disaster recovery capability for an extended period of time. Furthermore, it is often easy for a user to create recovery sessions incorrectly, producing additional errors that further contribute to system downtime, especially with complex copy types.

Moreover, similar concerns regarding high-speed, high-fidelity and highly accurate reconstruction of storage systems and copy relationships are presented by hardware upgrades that require data migration onto a replacement system, because the same copy relationships must be consistently and accurately replicated from the first storage system to the second storage system, and/or vice versa.

BRIEF SUMMARY

In one embodiment, a computer program product includes a computer readable storage medium having computer readable program code embodied therewith. The computer readable program code is configured for: validating a replication of copy services between a first storage system and a second storage system, removing a plurality of existing copy relationships between the first storage system and a failed storage system, creating a plurality of copy relationships between the first storage system and the second storage system, and synchronizing a plurality of data between the first storage system and the second storage system.

In another embodiment, a system includes a first storage system, a second storage system, logic adapted for validating a replication of copy services between the first storage system and the second storage system, logic adapted for removing a plurality of existing copy relationships between the first storage system and a failed storage system, logic adapted for creating a plurality of copy relationships between the first storage system and the second storage system, and logic adapted for synchronizing a plurality of data between the first storage system and the second storage system.

According to another embodiment, a method includes determining information regarding a second storage system, enabling copy services management software to connect a first system to the second storage system using the information regarding the second storage system, managing a provisioning of a plurality of volumes on the second storage system, managing a replication of copy services between the first storage system and the second storage system, validating the replication of copy services between the first storage system and the second storage system, removing a plurality of existing copy relationships between the first storage system and a third storage system, creating a plurality of copy relationships between the first storage system and the second storage system, and synchronizing a plurality of data between the first storage system and the second storage system.

Other aspects and embodiments of the present invention will become apparent from the following detailed description, which, when taken in conjunction with the drawings, illustrate by way of example the principles of the invention.

DETAILED DESCRIPTION

Figure 1:
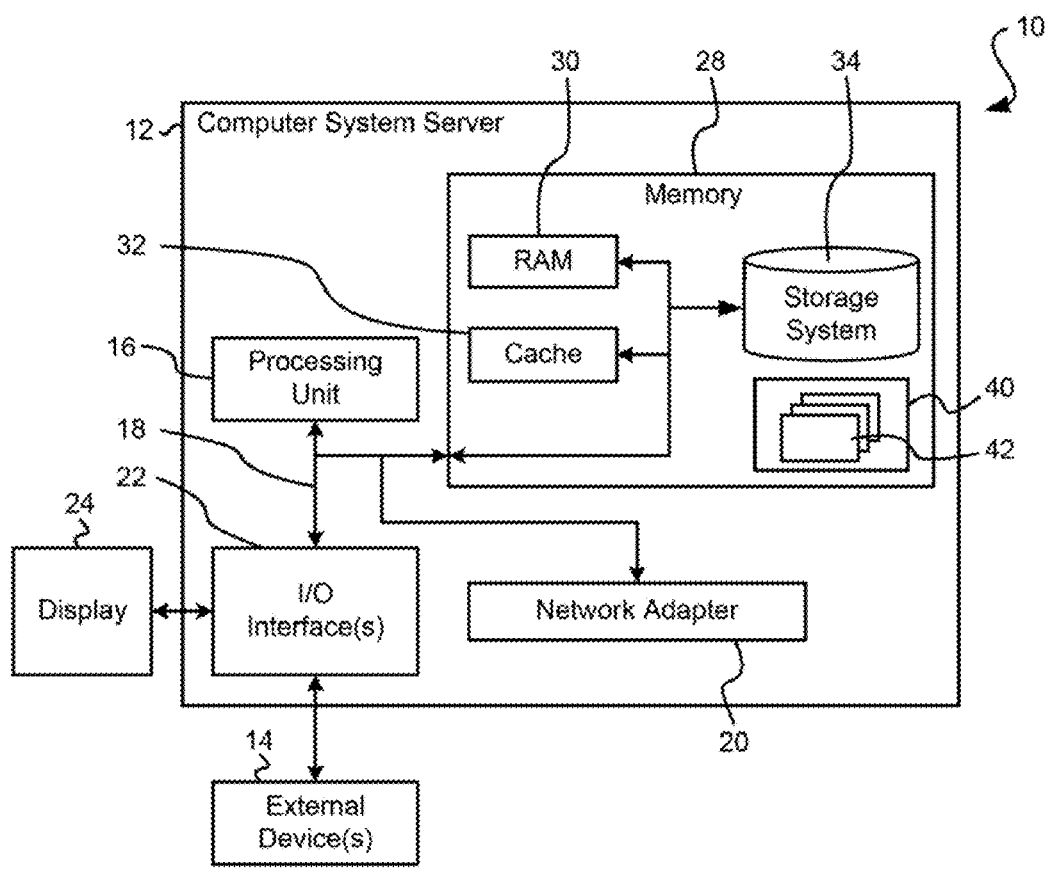
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A system, method, and computer program product for acquiring a new storage system into copy services management software are described herein. This allows a user to automatically replace volumes from one storage system with matching volumes from a replacement storage system using copy services management software.

In one general embodiment, a computer program product includes a computer readable storage medium having computer readable program code embodied therewith. The computer readable program code is configured for: validating a replication of copy services between a first storage system and a second storage system, removing a plurality of existing copy relationships between the first storage system and a failed storage system, creating a plurality of copy relationships between the first storage system and the second storage system, and synchronizing a plurality of data between the first storage system and the second storage system.

In another general embodiment, a system includes a first storage system, a second storage system, logic adapted for validating a replication of copy services between the first storage system and the second storage system, logic adapted for removing a plurality of existing copy relationships between the first storage system and a failed storage system, logic adapted for creating a plurality of copy relationships between the first storage system and the second storage system, and logic adapted for synchronizing a plurality of data between the first storage system and the second storage system.

According to another general embodiment, a method includes determining information regarding a second storage system, enabling copy services management software to connect a first system to the second storage system using the information regarding the second storage system, managing a provisioning of a plurality of volumes on the second storage system, managing a replication of copy services between the first storage system and the second storage system, validating the replication of copy services between the first storage system and the second storage system, removing a plurality of existing copy relationships between the first storage system and a third storage system, creating a plurality of copy relationships between the first storage system and the second storage system, and synchronizing a plurality of data between the first storage system and the second storage system.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email).The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
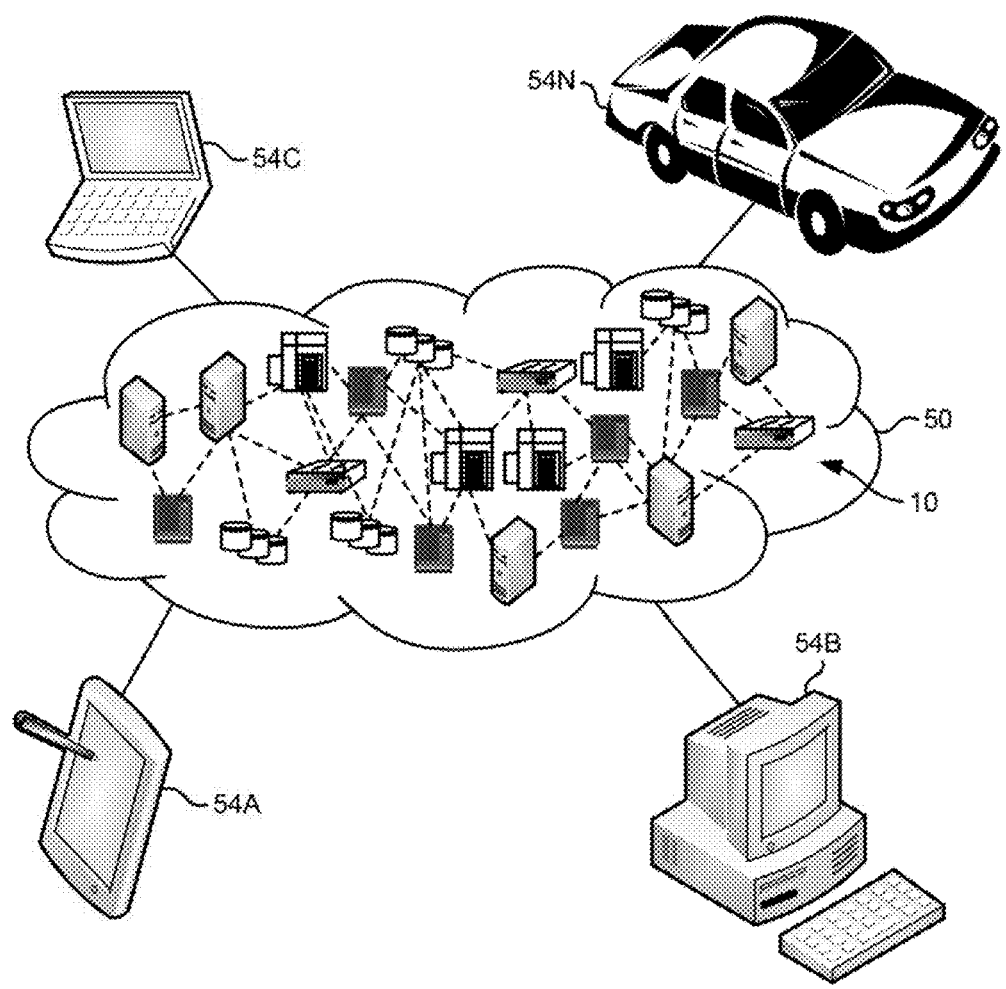
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
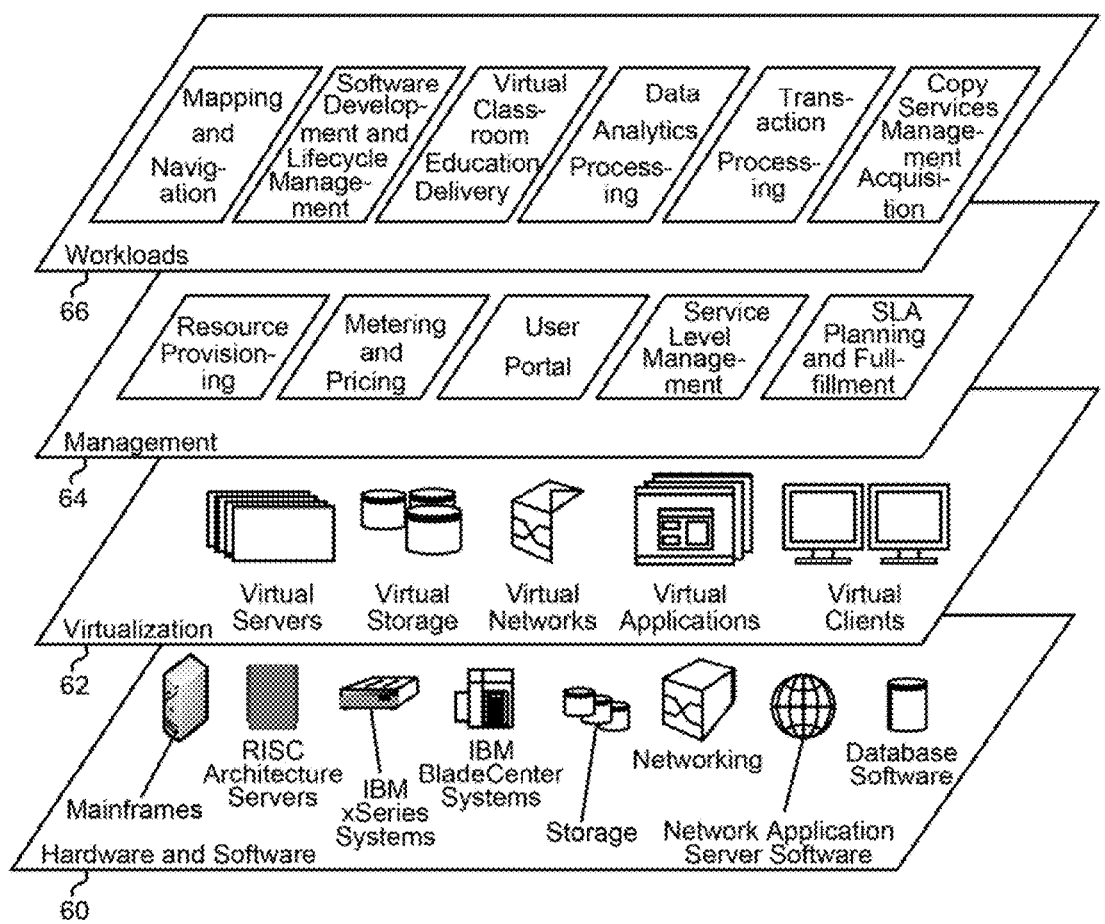
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery: data analytics processing; transaction processing; copy services management; etc., as will be understood by one having ordinary skill in the art upon reading the present descriptions.

Figure 4:
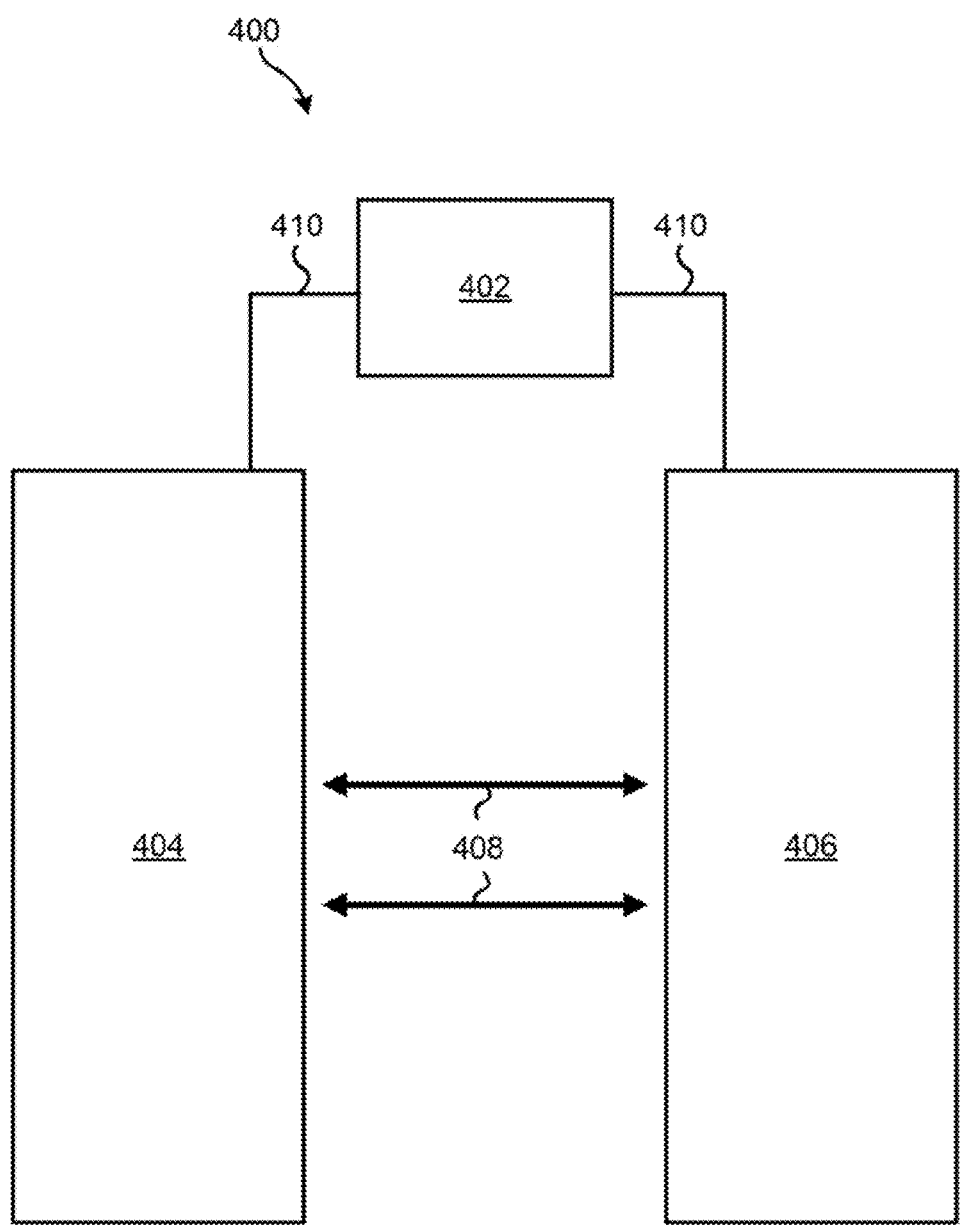
FIG. 4 depicts a typical copy services management architecture across two storage systems, according to the prior art.

Referring now to FIG. 4, a typical copy services management architecture 400 across two storage systems is shown, according to the prior art. As shown, the architecture 400 includes copy services management (CMS) software 402 managing copy services 410 and copy relationships 408 between a first storage system 404 and a second storage system 406. This second storage system 406 may be used in case of communication loss with the first storage system 404, failure of the first storage system 404, or any other interruption of the proper functioning of the first storage system 404.

Figure 5:
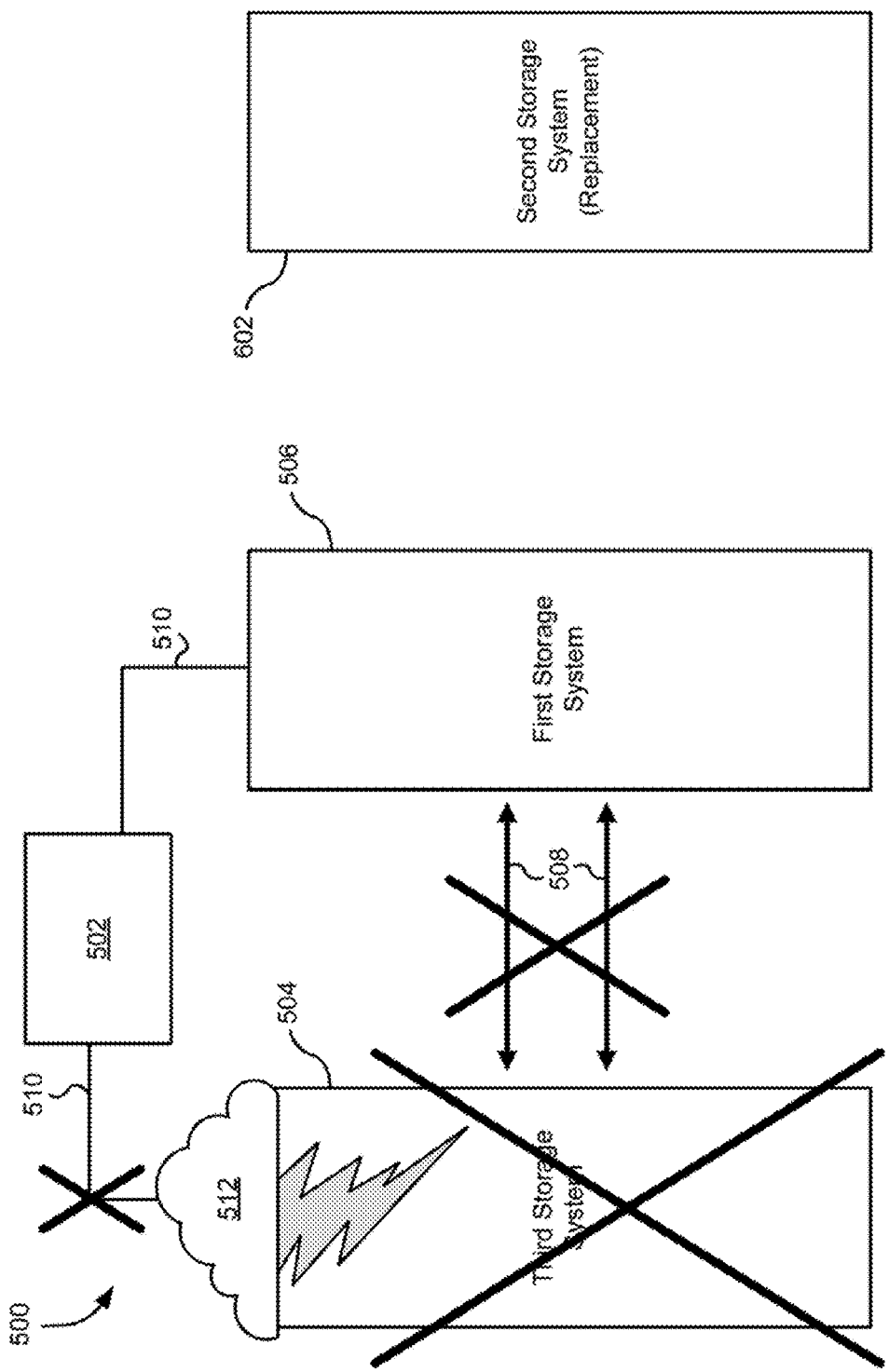
FIG. 5 depicts a copy services management architecture experiencing a disaster, according to one embodiment.

FIG. 5 depicts a copy services management architecture 500 experiencing a true disaster 512, according to one embodiment. The disaster 512 may cause a complete communication loss (as opposed to a temporary communication loss) between the copy services management software 502 and the third storage system 504, copy relationship failures between the third storage system 504 and the first storage system 506, or an outright failure of the third storage system 504 and/or components thereof.

As a result of the disaster 512, either copy services 510 between the first storage system 506 and the third storage system 504 may be disrupted, or alternatively the third storage system 504 may be rendered unusable. Regardless of which effect the disaster 512 has, the ultimate result causes corresponding loss of data and invalidates copy relationships 508 being managed by copy services management software 502 between the third storage system 504 and first storage system 506. In order to account for this eventuality, some embodiments of the copy services management architecture 500 may include a second storage system 602 (replacement) for acquisition into copy services management and subsequent restoration of copy services 510.

Under normal operating conditions, in some embodiments, either the first storage system 506 or the third storage system 504 act as a primary storage system, whereas the other system acts as a secondary storage system which mirrors the primary storage system. Due to this relationship, it does not matter which of the primary or secondary storage system fails or is rendered unusable, since the second storage system 602 may be configured to replace either the primary or secondary storage system. In additional embodiments, there may be more than a primary and secondary storage system, or there may be additional replication considerations, all of which may be taken into account when performing the methods and embodiments described herein.

Copy services 510 may or may not exist between the second storage system 602 and the first storage system prior to the disaster 512 or loss of communication with the third storage system 504. However, copy relationships 508, in most embodiments, do not exist between the second storage system 602 and the first storage system prior to the disaster 512 or loss of communication with the third storage system 504.

Figure 6:
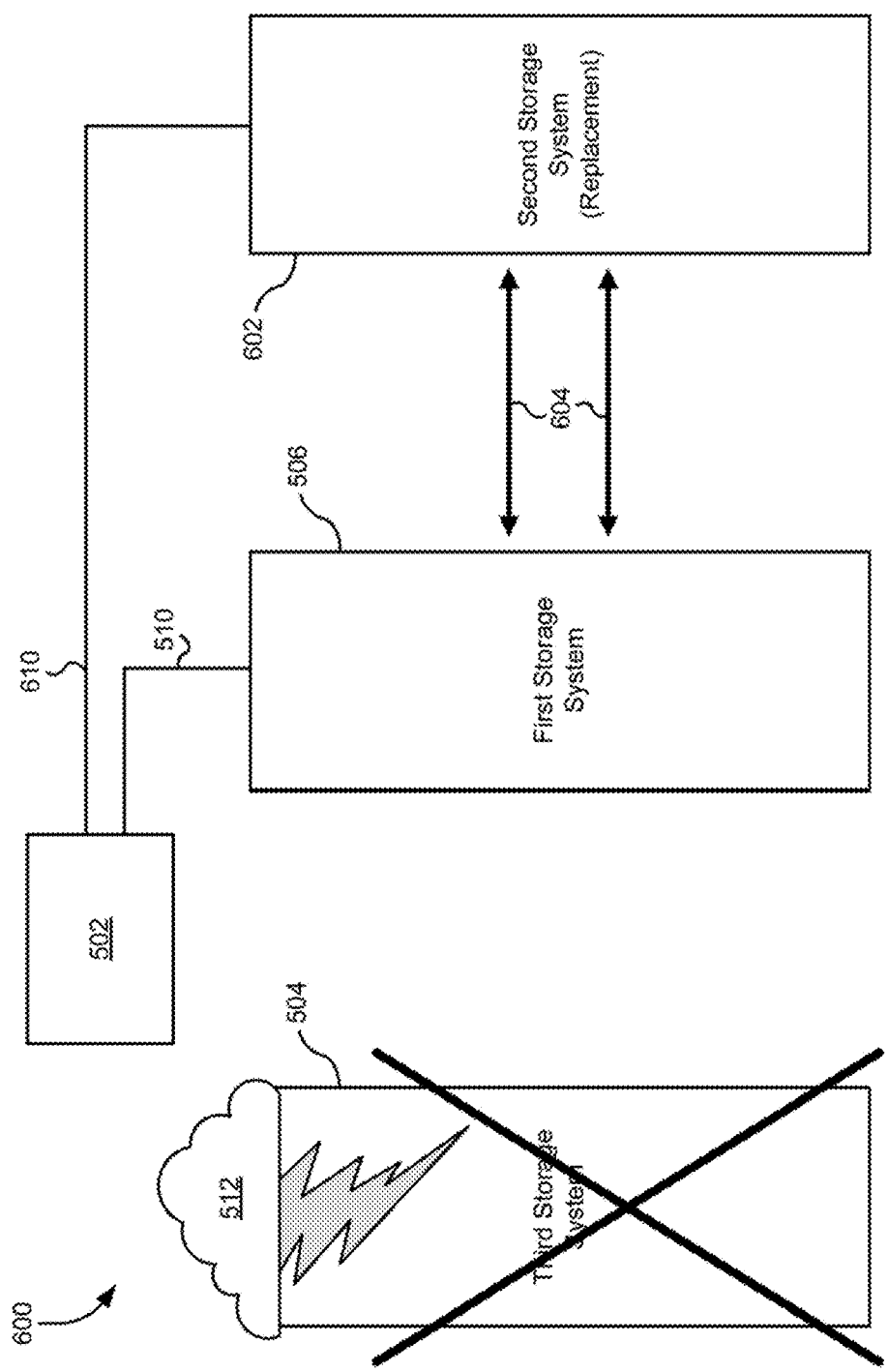
FIG. 6 depicts a copy services management architecture, according to one embodiment.

Referring now to FIG. 6, a copy services management software system 600 is shown according to one embodiment. The copy services management software system 600 may be used in disaster recovery, according to some embodiments. Of course, it may also be used for other purposes, such as migrating from one storage system to another, servicing/maintaining storage systems, etc., as would be understood by one of skill in the art upon reading the present descriptions.

As in FIG. 5, copy services management software 502 manages copy relationships between various storage systems. However, unlike in FIG. 5 where the third storage system 504 experienced a disaster 512, causing data loss and/or invalidating copy relationships 508 between the first storage system 506 and the third storage system 504, in the copy services management software system 600 shown in FIG. 6, a second storage system 602 is available to re-establish copy services management.

Copy services management software 502 acquires the second storage system 602 and establishes mirrored copy relationships 604 between the first storage system 602 and the second storage system 506, according to one embodiment. The acquisition of the second storage system 602 into copy services management may be accomplished by employing a copy services management acquisition process described herein and shown illustratively in FIGS. 7-8, according to one embodiment.

Figure 7:
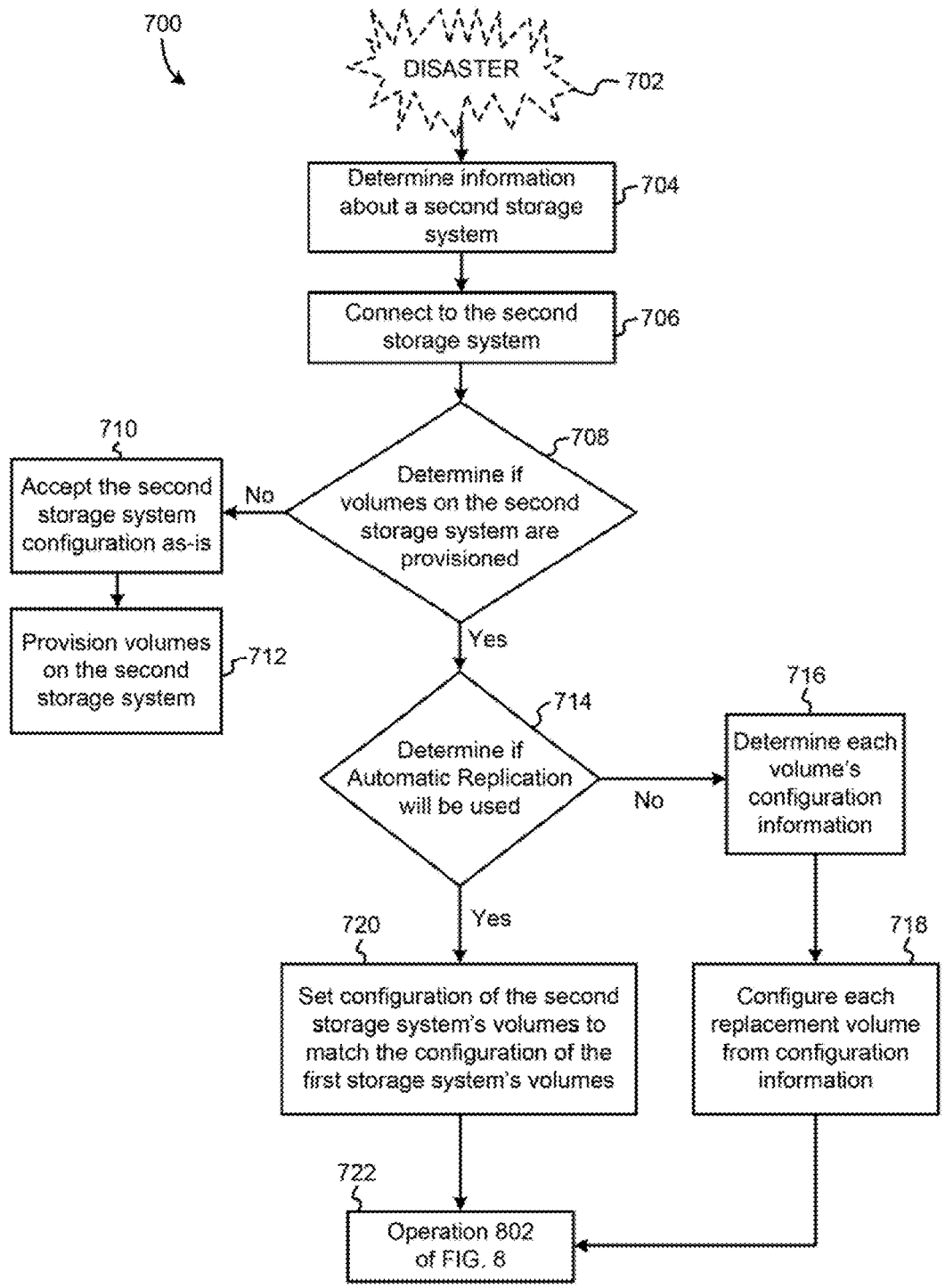
FIG. 7 depicts a flowchart of a method, according to one embodiment.

FIG. 7 depicts a flowchart of a method 700, according to one embodiment, for acquiring a new storage system into copy services management software. The process 700 may be carried out in any desired environment, including those shown in FIGS. 1-6, among others. Of course, more or less operations than those specifically described herein may be included in method 700, according to various embodiments.

In operation 702, a storage system (e.g., first storage system 504 of FIGS. 5 and 6) experiences a disaster (e.g., 512 of FIGS. 5 and 6). As a result, communication with the storage system may be lost, interrupted, or severed, or the storage system may be rendered unusable. Therefore, any attempt to access data stored on the storage system is unable to proceed properly.

In operation 704, information about a second storage system (e.g., second storage system 602 of FIG. 6) may be determined. This information may relate to a location of the second storage system (e.g., IP address) and may include information regarding connecting to and accessing data from the second storage system.

In one embodiment, a user may be prompted for system information parameters corresponding to the second storage system. Such system information parameters may include an IP address, a network port, one or more system hardware serial numbers, etc., as will be understood by one of skill in the art upon reading the present descriptions.

Upon receiving the second storage system information, the first storage system 504 is connected to the second storage system in operation 706.

Alternatively, in other embodiments where a disaster is not experienced, the method 700 may be carried out in response to any number of scenarios, including physical destruction of storage systems, loss of network connection(s) to storage systems, user-dictated data replication and/or migration (for any reason), hardware upgrades, etc., as would be understood by one of skill in the art upon reading the present descriptions.

Subsequently, in one approach, in operation 708, it is determined if volumes on the second storage system are provisioned already. In one approach, a user may be prompted to provide information as to whether volumes on the second storage system are already provisioned.

If the second storage system is not provisioned, the second storage system configuration is accepted as-is in operation 710, and replacement volumes are provisioned on the second storage system in operation 712. In some approaches, these replacement volumes may be created using tools resident within the data storage system. In one exemplary embodiment, replacement volumes may be created using the Tivoli Storage Productivity Center (TPC).

As understood herein, provisioning refers to the logical organization and configuration of the volumes within a storage system. In particular, as utilized with reference to the exemplary embodiment of FIG. 7, a storage system is considered to be "provisioned" if it is logically configured such that it is fully capable of interacting with copy services management software to accomplish copy services management.

Otherwise, in operation 714, when the second storage system is provisioned, then it is determined if Automatic Replication will be used to provision the second storage system (otherwise Manual Replication will be used). In one embodiment, a user may be prompted to decide whether to proceed with Automatic or with Manual Replication of copy services on the second storage system.

If Manual Replication is to be used, then in operation 716, each volume's configuration information on the first storage system is determined. In one embodiment, a user may be prompted for configuration information corresponding to each volume on the first storage system.

In one embodiment, as configuration information for each volume on the first storage system is provided, in operation 718, each corresponding volume on the second storage system is configured using the configuration information obtained in operation 716. If a user provided the configuration information, then each volume on the second storage system may be set in the particular configuration instructed by the user.

Alternatively, when Automatic Replication is to be used, configuration information for each volume on the second storage system is set in operation 720 automatically so as to match each corresponding volume in the first storage system, according to one embodiment.

Figure 8:
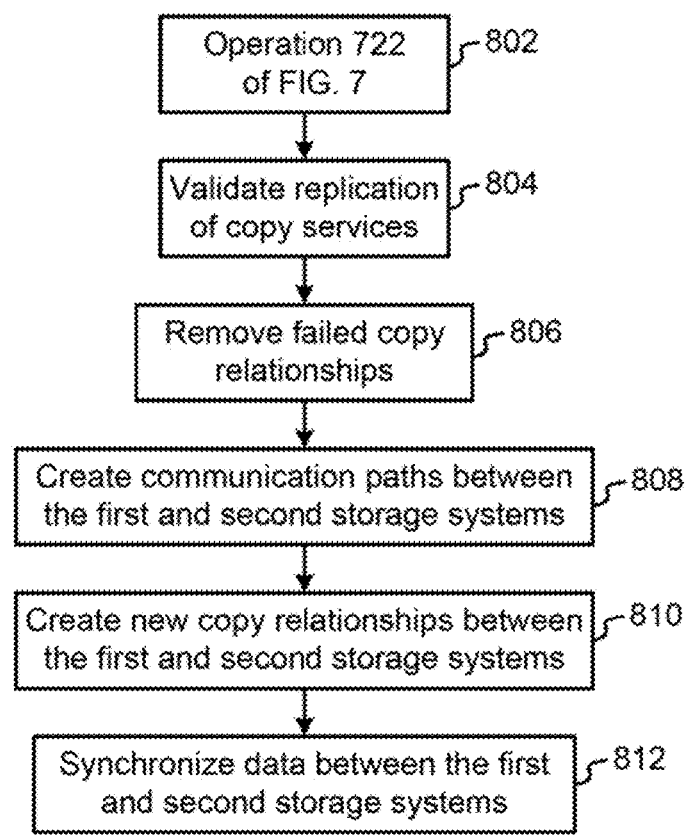
FIG. 8 depicts a flowchart of a method for acquiring a storage system into copy services management software, according to one embodiment.

Regardless of whether the Manual or Automatic Replication is used, after replication is completed, the method continues on to operation 722, in some embodiments, in order to proceed to the next processing step, as shown in FIG. 8.

Referring now to FIG. 8, a flowchart of a method 800 for automatically acquiring a second storage system into copy services management software is shown, according to one embodiment. In operation 802, the automatic acquisition process may accept all operations that were performed as a result of method 700 being performed, as illustrated in FIG. 7.

Referring again to FIG. 8, in operation 804, the automatic acquisition process initiates by validating replication of copy services from the first storage system to the second storage system. Validation may include a plurality of operations, including determining that the second storage system volumes have identical logical storage system (LSS) group characteristics, such as sizes and configurations, as the corresponding first storage system volumes. Furthermore, validation may also include determining that the second storage system volumes have identical input/output (I/O) group characteristics, such as sizes and configurations, as the corresponding first storage system volumes. Of course, these exemplary validation processes are offered by way of example, not limitation, and other embodiments of validation processes may also include additional operations as would be understood by one of skill in the art upon reading the present descriptions.

Validation of the replication of copy services may be accomplished in one exemplary embodiment by utilizing tools within the Tivoli Storage Productivity Center for Replication (TPC-R).

After the replication of copy services is validated in operation 804, old and/or failed copy relationships between the first and third storage system are removed in operation 806, according to one embodiment.

In operation 808, communication paths are created between the first and second storage systems. These paths may allow for any and/or all types of communication between the first and second storage systems, but particularly the ability to create copy relationships between the systems is established, in some approaches.

In operation 810, copy relationships are automatically created between the first and second storage systems so as to mirror the copy relationships previously existing between the first and third storage systems.

In operation 812, data is synchronized between the first and second storage systems, completing the copy services acquisition process. Any entity, such as a user, another system, an application, a routine, etc., may continue storing and accessing data as before the loss of communication with the third storage system and/or disaster without further configuration of the second storage system, which will now act just like the third storage system did previously.

In some embodiments, users may utilize copy services acquisition even in the absence of any disaster or loss of data to migrate a storage system structure, contents, and copy relationships from one location to another.

The copy services management tool described herein may accomplish the above described acquisition process without requiring a user to manually create new copy relationships. One resulting advantage of automated copy services management acquisition is that it can save system administrators and users significant time while simultaneously drastically reducing the margin of error introduced by recreating potentially thousands of copy relationships manually.

As a result, data storage network users may establish fully functional copy services environment with relatively low investment of time and energy and which is equally or more capable of disaster recovery compared to conventional copy services management. As such, this system provides a true end-to-end disaster/recovery solution that is applicable to any copy services management tool. To provide an exemplary embodiment, various embodiments are described herein with primary reference to one exemplary embodiment, the Tivoli Storage Productivity Center for Replication.

In one embodiment, the copy services management acquisition process enables a new and valuable feature for users of copy services management software that is not currently unavailable in TPC-R. As such, failures that otherwise would require extensive, intensive, and error prone methods that must be carried out manually or with multiple steps using multiple TPC-R sessions may be resolved automatically using the copy services management acquisition process described herein.

Additionally, in other embodiments the copy services management acquisition process may be employed to migrate their data centers from one location to another, even in the absence of any disaster or data loss.

Advantageously, all embodiments of this invention also preserve the original direction and configuration of the replication session(s). In an undesirable example, a user engaged in the process of manually replacing a lost storage system experiences a copy services session running in the opposite direction compared to the original configuration (e.g., if the session was running from first storage system A to second storage system B it may subsequently run from second storage system B to first storage system C). While it is possible, for most session types, to reverse the direction of replication, these sessions still technically run in reverse of the preferred direction. Therefore, in order to completely restore the configuration manually, two manual session creations and migrations are required. Undesirably, this further increases the time required for a full disaster recovery and increases the likelihood of error. All these disadvantageous consequences may be avoided by employing an automated process for acquiring new storage systems into copy services management software.

In some embodiments, copy services management acquisition may be implemented as either a separate or integrated tool in existing copy services management software products.

According to one embodiment, a computer program product comprises a computer readable storage medium having computer readable program code embodied therewith. The computer readable program code is configured for: validating a replication of copy services between a first storage system and a second storage system, removing a plurality of existing copy relationships between the first storage system and a failed storage system, creating a plurality of copy relationships between the first storage system and the second storage system, and synchronizing a plurality of data between the first storage system and the second storage system. Any of the embodiments described above may be incorporated into the computer program product as would be understood by one of skill in the art upon reading the present descriptions.

In a further embodiment, the computer readable program code for validating the replication of copy services between the first storage system and the second storage system may be configured for: determining that each of a plurality of volumes on the second storage system has identical LSS group characteristics as each of a plurality of corresponding volumes on the first storage system, and determining that each of the plurality of volumes on the second storage system has identical I/O group characteristics as each of the plurality of corresponding volumes on the first storage system.

In a further embodiment, the LSS group characteristics may comprise configuration and size, among other characteristics, and the I/O group characteristics may comprise configuration and size, among other characteristics.

According to another embodiment, the computer readable program code may be configured for: determining information regarding the second storage system, enabling copy services management software to connect to the second storage system using the information regarding the second storage system, managing a provisioning of a plurality of volumes on the second storage system, and managing the replication of copy services between the first storage system and the second storage system. Any of the embodiments described above may be incorporated into the computer program product as would be understood by one of skill in the art upon reading the present descriptions.

According to a further approach, the information regarding the second storage system may include an IP address of the second storage system. Also, the provisioning of the plurality of volumes on the second storage system comprises a logical configuration enabling management of copy services on the second storage system, in some approaches. Furthermore, in some approaches, the computer readable program code configured for managing the provisioning of the plurality of volumes on the second storage system may be configured for: determining that a plurality of volumes on the second storage system are not provisioned, accepting the second storage system's system configuration, and provisioning the plurality of volumes on the second storage system.

In another approach, provisioning the plurality of volumes on the second storage system may comprise computer readable program code configured for: determining the first storage system's volume configuration and replicating the first storage system's volume configuration to the second storage system.

According to one approach, the computer readable program code configured for managing the provisioning of the plurality of volumes on the second storage system may be configured for: determining that the plurality of volumes on the second storage system are provisioned, determining that the replication of copy services is to proceed automatically, and setting a volume configuration on the second storage system to match the first storage system's volume configuration. Any of the embodiments described above may be incorporated into the computer program product as would be understood by one of skill in the art upon reading the present descriptions.

According to another embodiment, the computer readable program code configured for managing the provisioning of the plurality of volumes on the second storage system may be configured for: determining that the plurality of volumes on the second storage system are provisioned, determining that the replication of copy services is to proceed manually, prompting a user for a volume configuration for each of the plurality of volumes on the second storage system, and setting the volume configuration for each of the plurality of volumes on the second storage system to the user-provided volume configuration.

According to another embodiment, a system may include logic adapted for executing any of the operations described in either or both of methods 700 and 800 described in FIGS. 7-8, according to various embodiments.

In one exemplary embodiment, the system may comprise a first storage system, a second storage system, logic adapted for validating a replication of copy services between the first storage system and the second storage system, logic adapted for removing a plurality of existing copy relationships between the first storage system and a failed storage system, logic adapted for creating a plurality of copy relationships between the first storage system and the second storage system, and logic adapted for synchronizing a plurality of data between the first storage system and the second storage system. Any of the embodiments described above may be incorporated into the system as would be understood by one of skill in the art upon reading the present descriptions.

While the various embodiments have been described with particular reference to a disaster recovery scenario, of course the above descriptions have not been presented by way of limitation and the system and methods described herein do not require a disaster to realize advantages of automatic acquisition of storage systems into copy services management software. In particular, other embodiments may employ automatic acquisition of storage systems into copy services management software in order to facilitate migration of storage system(s) in response to any number of scenarios, including physical destruction of storage systems, loss of network connection(s) to storage systems, user-dictated data replication and/or migration for any reason, hardware upgrades, and etc., as will be understood by one having ordinary skill in the art upon reading the present descriptions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer readable storage medium having computer readable program code embodied therewith, the computer readable program code comprising:
    computer readable program code configured to provide copy services between a first storage system and a third storage system;
    computer readable program code configured to detect failure and/or unusability of the third storage system;
    computer readable program code configured to set configuration information of volumes on a second storage system to match volumes on the first storage system;
    computer readable program code configured to validate a replication of copy services between the first storage system and a second storage system, wherein copy services do not exist between the second storage system and the first storage system prior to detecting the failure and/or unusability of the third storage system;
    computer readable program code configured to remove a plurality of existing copy relationships between the first storage system and the third storage system;
    computer readable program code configured to create a plurality of copy relationships between the first storage system and the second storage system that mirror copy relationships previously existing between the first and third storage systems, wherein copy relationships do not exist between the second storage system and the first storage system prior to detecting the failure and/or unusability of the third storage system; and
    computer readable program code configured to synchronize a plurality of data between the first storage system and the second storage system.

2. The computer program product as recited in claim 1, wherein the computer readable program code configured to validate the replication of copy services between the first storage system and the second storage system comprises:
    computer readable program code configured for determining that each of a plurality of volumes on the second storage system has identical logical storage system (LSS) group characteristics as each of a plurality of corresponding volumes on the first storage system; and
    computer readable program code configured for determining that each of the plurality of volumes on the second storage system has identical input/output (I/O) group characteristics as each of the plurality of corresponding volumes on the first storage system.

3. The computer program product as recited in claim 2, wherein the LSS group characteristics comprise configuration and size; and
    wherein the I/O group characteristics comprise configuration and size.

4. The computer program product as recited in claim 1, further comprising:
    computer readable program code configured for determining information regarding the second storage system;
    computer readable program code configured for enabling copy services management software to connect to the second storage system using the information regarding the second storage system;
    computer readable program code configured for managing a provisioning of a plurality of volumes on the second storage system; and
    computer readable program code configured for managing the replication of copy services between the first storage system and the second storage system.

5. The computer program product as recited in claim 4, wherein the information regarding the second storage system comprises an IP address of the second storage system.

6. The computer program product as recited in claim 4, wherein the provisioning of the plurality of volumes on the second storage system comprises a logical configuration enabling management of copy services on the second storage system.

7. The computer program product as recited in claim 4, wherein the computer readable program code configured for managing the provisioning of the plurality of volumes on the second storage system comprises:
    computer readable program code configured for determining that a plurality of volumes on the second storage system are not provisioned;
    computer readable program code configured for accepting the second storage system's system configuration; and
    computer readable program code configured for provisioning the plurality of volumes on the second storage system.

8. The computer program product as recited in claim 7, wherein the provisioning the plurality of volumes on the second storage system comprises:
    computer readable program code configured for determining the first storage system's volume configuration; and computer readable program code configured for replicating the first storage system's volume configuration to the second storage system.

9. The computer program product as recited in claim 4, wherein the computer readable program code configured for managing the provisioning of the plurality of volumes on the second storage system comprises:
   computer readable program code configured for determining that the plurality of volumes on the second storage system are provisioned;
   computer readable program code configured for determining that the replication of copy services is to proceed automatically; and
   computer readable program code configured for setting a volume configuration on the second storage system to match the first storage system's volume configuration.

10. The computer program product as recited in claim 4, wherein the computer readable program code configured for managing the provisioning of the plurality of volumes on the second storage system comprises:
   computer readable program code configured for determining that the plurality of volumes on the second storage system are provisioned;
   computer readable program code configured for determining that the replication of copy services is to proceed manually;
   computer readable program code configured for prompting a user for a volume configuration for each of the plurality of volumes on the second storage system; and
   computer readable program code configured for setting the volume configuration for each of the plurality of volumes on the second storage system to the user-provided volume configuration.

11. A system, comprising:
   a first storage system;
   a second storage system;
   logic configured to provide copy services between a first storage system and a third storage system;
   logic configured to detect failure and/or unusability of the third storage system;
   logic configured to set configuration information of volumes on a second storage system to match volumes on the first storage system;
   logic configured to validate a replication of copy services between the first storage system and the second storage system, wherein copy services do not exist between the second storage system and the first storage system prior to detecting the failure and/or unusability of the third storage system;
   logic configured to remove a plurality of existing copy relationships between the first storage system and the third storage system;
   logic configured to create a plurality of copy relationships between the first storage system and the second storage system that mirror copy relationships previously existing between the first and third storage systems;
   logic configured to synchronize a plurality of data between the first storage system and the second storage system;
   logic configured to determine information regarding the second storage system;
   logic configured to enable copy services management software to connect to the second storage system using the information regarding the second storage system;
   logic configured to determine that the plurality of volumes on the second storage system are provisioned;
   logic configured to determine that the replication of copy services is to proceed manually;
   logic configured to prompt a user for a volume configuration for each of the plurality of volumes on the second storage system, the volume configuration for each of the plurality of volumes on the second storage system corresponding to each volume on the first storage system;
   logic configured to set the volume configuration for each of the plurality of volumes on the second storage system to the user-provided volume configuration; and
   logic configured to manage the replication of copy services between the first storage system and the second storage system.

12. The system as recited in claim 11, wherein the logic configured to validate the replication of copy services between the first storage system and the second storage system comprises:
   logic configured to determine that each of a plurality of volumes on the second storage system has identical logical storage system (LSS) group characteristics as each of a plurality of corresponding volumes on the first storage system; and
   logic configured to determine that each of the plurality of volumes on the second storage system has identical input/output (I/O) group characteristics as each of the plurality of corresponding volumes on the first storage system.

13. The system as recited in claim 12,
   wherein the LSS group characteristics comprise configuration and size; and
   wherein the I/O group characteristics comprise configuration and size.

14. The system as recited in claim 11, wherein the information regarding the second storage system comprises an IP address of the second storage system.

15. The system as recited in claim 11, wherein the logic configured to manage the provisioning of the plurality of volumes on the second storage system comprises:
   logic configured to determine that a plurality of volumes on the second storage system are not provisioned;
   logic configured to accept the second storage system's system configuration; and
   logic configured to provision the plurality of volumes on the second storage system, the provisioning comprising:
      logic configured to determine the first storage system's volume configuration; and
      logic configured to replicate the first storage system's volume configuration to the second storage system.

16. The system as recited in claim 11, wherein the logic adapted for managing the provisioning of the plurality of volumes on the second storage system comprises:
   logic configured to determine that the plurality of volumes on the second storage system are provisioned;
   logic configured to determine that the replication of copy services is to proceed automatically; and
   logic configured to set a volume configuration on the second storage system to match the first storage system's volume configuration.

17. A method, comprising:
   providing copy services between a first storage system and a third storage system;
   determining information regarding a second storage system upon failure and/or unusability of the third system;
   enabling copy services management software to connect the first storage system to the second storage system using the information regarding the second storage system;
   managing a provisioning of a plurality of volumes on the second storage system;

prompting a user to decide whether to proceed with automatic or with manual replication of copy services on the second storage system;

managing a replication of copy services between the first storage system and the second storage system;

validating the replication of copy services between the first storage system and the second storage system;

removing a plurality of existing copy relationships between the first storage system and the third storage system;

automatically creating a plurality of copy relationships between the first storage system and the second storage system that mirror copy relationships previously existing between the first and third storage systems; and synchronizing a plurality of data between the first storage system and the second storage system.

18. The method as recited in claim 17, wherein validating the replication of copy services between the first storage system and the second storage system comprises:

determining that each of a plurality of volumes on the second storage system has identical logical storage system (LSS) group characteristics as each of a plurality of corresponding volumes on the first storage system; and determining that each of the plurality of volumes on the second storage system has identical input/output (I/O) group characteristics as each of the plurality of corresponding volumes on the first storage system.

19. The method as recited in claim 17, wherein managing the provisioning of the plurality of volumes on the second storage system comprises:

determining that the plurality of volumes on the second storage system are provisioned;

determining that the replication of copy services is to proceed manually;

prompting a user for a volume configuration for each of the plurality of volumes on the second storage system; and setting the volume configuration for each of the plurality of volumes on the second storage system to the user-provided volume configuration.

* * * * *